May 26, 1942.　　　L. T. KNOCKE　　　2,284,152
PISTON
Filed May 2, 1938
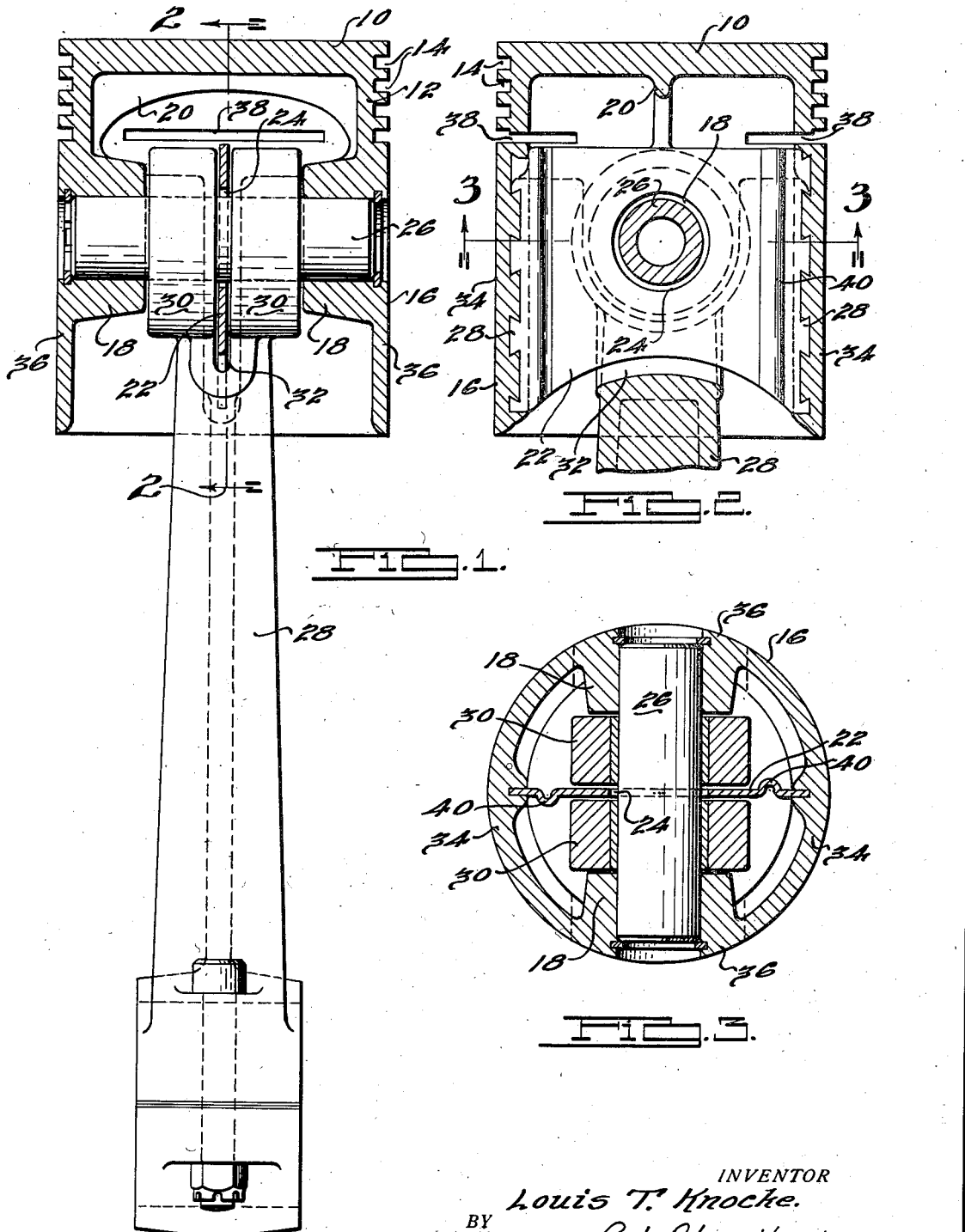

Patented May 26, 1942

2,284,152

UNITED STATES PATENT OFFICE 2,284,152

PISTON

Louis T. Knocke, Detroit, Mich., assignor to Chrysler Corporation, Highland Park, Mich., a corporation of Delaware Application May 2, 1938, Serial No. 205,430

4 Claims. (Cl. 309—13)

This invention relates to a piston and is illustrated as embodied in a piston for an internal combustion engine and particularly to a piston composed of a metal, such as aluminum, having a relatively high coefficient of expansion as compared with iron.

In the manufacture of internal combustion engines it is desirable to use pistons composed of aluminum or similar light metal alloy in order to reduce the weight of the reciprocating parts. In order to operate satisfactorily it is necessary that the piston have sufficient clearance to prevent piston seizing within the cylinder at operating temperatures and at the same time to provide a relatively small clearance to prevent piston slap when the piston is cold. In aluminum pistons, due to the relatively high coefficient of expansion of the metal, the piston is usually made having considerable clearance when cold to prevent seizing when at operating temperature.

It is an important object of this invention to provide control means for the piston skirt to maintain its expansion, due to heat, within minimum limits so that when the piston is cold it may be fitted in the cylinder with less clearance than usual and when heated to operating temperature it is maintained substantially at its original diameter to prevent seizing.

Another object of the invention is to provide a plate strut member having its opposite edges connected respectively to oppositely disposed portions of the skirt and which edges extend substantially the full length of the piston skirt.

A further object of the invention is to separate the portions of the skirt, which are connected to the strut, from the pison head so that the expansion and heat conductivity of the head are not transferred to that portion of the skirt.

Another object is to extend the strut through the bearing portion of the connecting rod so that the strut intersects the wrist pin bearing axis thereby permitting the use of an exceptionally wide strut to control the entire length of skirt; the connecting rod bearing being bifurcated to receive the strut with a portion of the bearing on opposite sides of the strut.

Other objects are to provide means within the strut to maintain it under initial tension and to grind the outer periphery of the skirt oval with its thrust faces intersecting the major axis and its wrist pin bearings intersecting the minor axis.

Other objects and advantages of the invention will more fully appear from the following description taken in connection with the accompanying drawing, in which:

Fig. 1 is a vertical sectional view of a piston through the wrist pin bosses showing the connecting rod in section;

Fig. 2 is a sectional view taken on line 2—2 of Fig. 1 through the thrust faces; and Fig. 3 is a sectional view taken on line 3—3 of Fig. 2.

Referring to the drawing the piston illustrated is generally of the full trunk type including a head 10 having a depending cylindrical flange 12 provided with ring grooves 14 and a skirt 16 integral with and depending from the lower edge of the ring flange 12. Wrist pin bosses 18 are formed integral with the piston skirt 16 and are provided with a reinforcing rib 20 which extends upwardly over each wrist pin boss and across the inside of the head integrally uniting the wrist pin bosses, skirt and head. The head 10, skirt 16 and wrist pin bosses 18 are preferably cast from aluminum.

A strut 22 formed from substantially flat sheet material such as steel or other metal having a comparatively low coefficient of expansion has its opposite edges moulded in the walls of the skirt at points extending longitudinally of the piston and midway between the wrist pin bosses. The strut extends transversely of the piston in a plane intersecting the axis of the wrist pin bosses and has a longitudinal dimension such that its upper and lower edges are respectively above and below the wrist pin bosses. The central portion of the strut 22 is provided with an opening 24 to permit the insertion of the wrist pin 26 therethrough. The opposite edges of the strut 22 may be provided with dovetails 28 as shown in Fig. 2 to form an interlocking connection between the cast metal of the skirt and the strut.

The connecting rod 28 is provided with axially spaced end bearings 30 which are journaled on the wrist pin 26 and are arranged at opposite sides of the strut 22. The connecting rod 28 is slotted between the bearings as at 22 to receive the lower edge of the strut 22. The slot is of sufficient length to permit the relative angular movement between the piston and connecting rod 28.

In the form of the invention illustrated the piston is machined oval providing a pair of oppositely disposed thrust faces 34 at the major axis of the oval and a pair of non-thrust faces 36 at the minor axis of the oval. The non-thrust faces 36 are in the region of the wrist pin bosses 18 and the thrust faces are between the wrist pin bosses 18. The thrust faces 34 are separated from the head 10 and cylindrical flange 12 by oppositely disposed circumferential slots 38.

In the manufacture of the piston the molten metal forming the piston proper is cast around the opposite edges of the strut 22. The molten metal is at a temperature above its normal operating temperature and consequently it is expanded to its maximum diameter. After the piston has cooled to its machining temperature there is some tendency to place the strut 22 under a compression strain due to the fact that the aluminum piston contracts more than the strut due to the higher thermal expansion of the piston material over the strut material.

It is desirable to maintain the strut 22 normally under tension so that when the piston is heated the strut initially under tension will hold the thrust faces within predetermined limits without first permitting expansion to take up the compression strain on the strut. To accomplish this result, after the piston has cooled from the casting operation a portion of the strut is distorted as illustrated by the longitudinal ribs 40.

The thrust faces 34 of the piston are machined to close clearance with the cylinder wall. When the piston is cold there is no piston slap due to the close fit. As the piston heats up expansion of the thrust faces is controlled by the strut 22 and the only expansion is at the non-thrust faces where the clearance is considerably greater than at the thrust faces due to the oval machining.

It will be understood that various changes including the size, shape and arrangement of parts may be made without departing from the spirit of my invention and it is not my intention to limit its scope other than by the terms of the appended claims.

I claim:

1. A piston comprising a head, a pair of spaced wrist pin bosses depending from said head having aligned bearing openings, a skirt substantially elliptical in transverse cross section having its major axis perpendicular to the axis of said wrist pin bearings, said skirt being separated from said head in a region between said wrist pin bosses and connected to said head in the region of said wrist pin bosses, and a strut plate under initial tension connecting opposed faces of said skirt in a plane coincident with the major axis of said elliptical skirt and intersecting the axis of said wrist pin bearings.

2. A piston comprising a head, a cast skirt, and a cast in strut connecting portions of said skirt, said strut being deformed after the casting operation and under tension.

3. A piston comprising a head, and a cast skirt, and a cast in strut connecting portions of said skirt and having a portion thereof deformed after the casting operation to change its effective length to thereby impart initial stress to said skirt.

4. A cast piston comprising a head and a skirt, and a cast in strut connecting portions of said skirt and having a portion thereof deflected after the piston has been formed to shorten its effective length to thereby impart initial stress to said skirt.

LOUIS T. KNOCKE.